United States Patent
Axelsson et al.

(10) Patent No.: US 8,317,471 B2
(45) Date of Patent: Nov. 27, 2012

(54) METHOD FOR PREVENTING ROTOR OVERSPEED OF A WIND TURBINE

(75) Inventors: Ulf Axelsson, Karlstad (SE); Christian Haag, Karlstad (SE); Mikael Björk, Karlstad (SE); Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/306,926

(22) Filed: Nov. 29, 2011

(65) Prior Publication Data

US 2012/0134807 A1 May 31, 2012

(51) Int. Cl.
*F03D 7/02* (2006.01)
(52) U.S. Cl. ............................................. 416/41; 416/36
(58) Field of Classification Search ................ 416/36, 416/41, 46
See application file for complete search history.

(56) References Cited

U.S. PATENT DOCUMENTS

| | | | |
|---|---|---|---|
| 7,004,724 B2 | 2/2006 | Pierce et al. | |
| 7,118,399 B1 | 10/2006 | Wen et al. | |
| 2008/0304964 A1* | 12/2008 | Yoshida | 416/41 |
| 2010/0054939 A1 | 3/2010 | Hoffmann | |
| 2010/0181769 A1 | 7/2010 | Altemark et al. | |
| 2011/0076142 A1* | 3/2011 | Veldkamp et al. | 416/1 |

FOREIGN PATENT DOCUMENTS

EP 2208886 A2 7/2010

\* cited by examiner

*Primary Examiner* — Dwayne J White
(74) *Attorney, Agent, or Firm* — Global Patent Operation; Douglas D. Zhang (57) ABSTRACT

A method for preventing a possible overspeed of a wind turbine rotor with at least one rotor blade is provided. The method includes detecting a yaw misalignment of the rotor, and imposing a restriction on changes of a pitch angle towards a feathered position of the at least one rotor blade after detecting the yaw misalignment. Further, a wind turbine having a rotor and a control system configured to prevent a possible overspeed of the rotor is provided.

20 Claims, 6 Drawing Sheets

METHOD FOR PREVENTING ROTOR OVERSPEED OF A WIND TURBINE

BACKGROUND OF THE INVENTION

The subject matter described herein relates generally to methods and systems for controlling a wind turbine, and more particularly, to methods and systems for preventing overspeed of a wind turbine rotor during a misalignment of the wind turbine rotor.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

At high winds, high turbulence and/or up-flow, wind turbines may experience outage due to a high yaw misalignment. The yaw moment induced by the rotor cannot longer be counteracted by the yaw system and yaw runaway may be observed. In this event, the control system of the wind turbine may try to compensate lowering of rotor speed and power losses resulting form the yaw misalignment. Under fluctuating wind conditions this may in turn result in an unwanted overspeed of the rotor.

In view of the above, there is a desire for improved controlling of wind turbines during yaw misalignment.

BRIEF DESCRIPTION OF THE INVENTION

In one aspect, a method for preventing a possible overspeed of a rotor of a wind turbine is provided. The method includes detecting a yaw misalignment of the rotor and imposing restrictions on changes of a pitch angle towards a fully-powered position of at least one rotor blade mounted to the rotor after detecting the yaw misalignment.

In another aspect, a wind turbine is provided. The wind turbine includes a rotor, at least one rotor blade mounted to the rotor, and a control system. The control system includes a pitch system configured to rotate the at least one rotor blade about a pitch axis and a yaw system. The yaw system is configured to position the rotor with respect to a wind direction in accordance with a yaw angle set-point and includes a yaw sensor which is configured to detect an actual yaw angle. The control system is configured to determine a difference between the actual yaw angle and the yaw angle set-point, and to determine based on the difference if a rotation of the at least one rotor blade in a direction to a fully-powered position is to be limited.

In yet another aspect, a control system for controlling a wind turbine is provided. The controller includes an input module, a pitch module, and a yaw module. The input module is configured to receive an actual value of a yaw angle of a yaw adjustment system of the wind turbine and an actual value of a status of an electrical system of the wind turbine. The pitch module is connected with the input module and configured to determine a pitch angle set-point so that the status of the electrical system and a set-point of the status of the electrical system substantially match. The yaw module is connected with the input module and the pitch module. The yaw module is configured to determine a yaw angle set-point and a difference between the yaw angle set-point and the actual value of the yaw angle. The yaw module is further configured to prevent, depending on the difference between the yaw angle set-point and the actual value of the yaw angle, a decrease of the pitch angle set-point.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine having a control system and a related method that limits changes of the rotor blade in direction of the fully-powered position when a yaw misalignment is detected. Accordingly, a possible overspeed of the rotor and a possible emergency shut-down of the wind turbine may be avoided.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
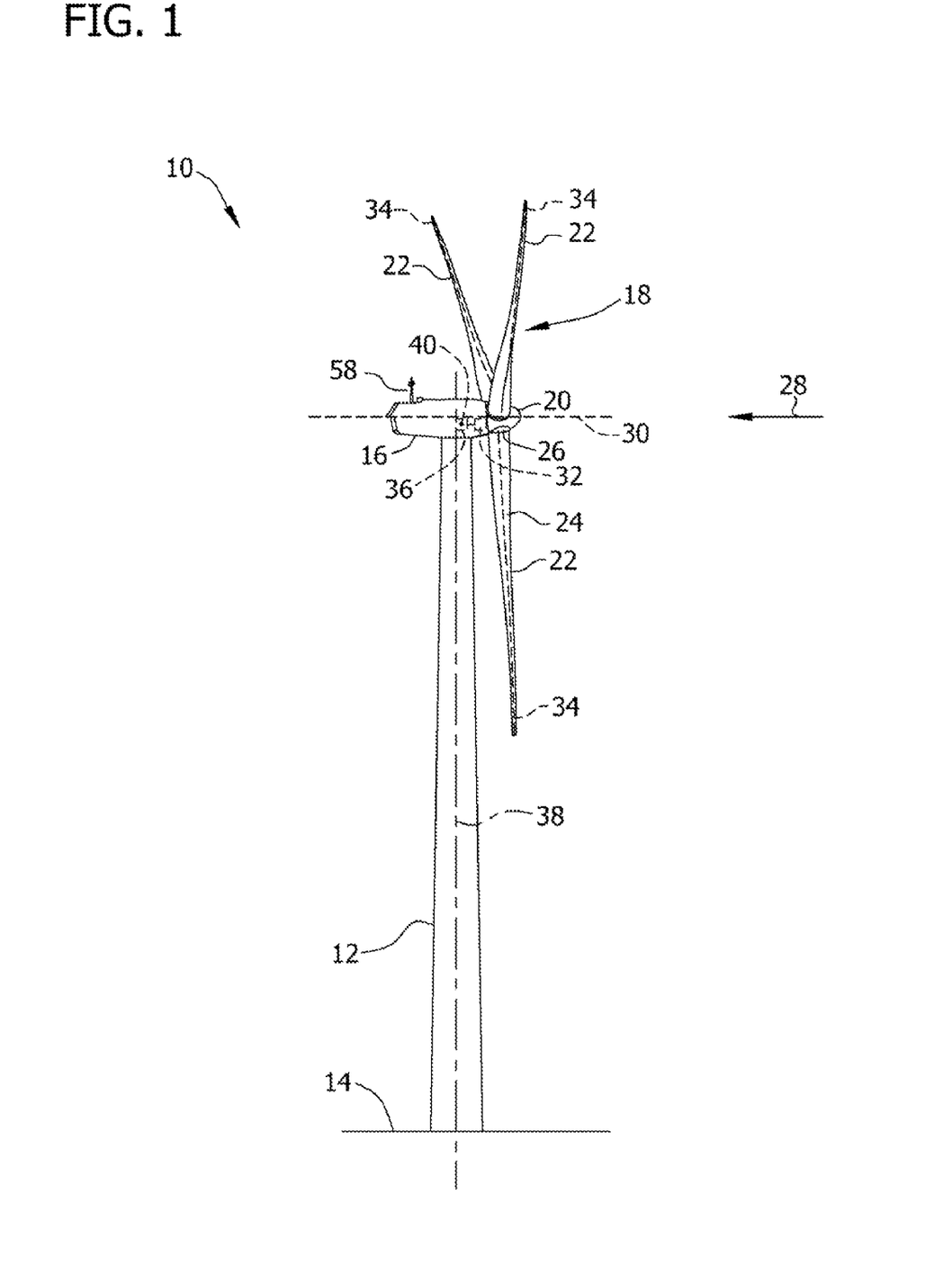
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Nacelle 16 also includes at least one meteorological mast 58 that includes a wind vane and anemometer (neither shown in FIG. 1). Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18. The blade pitch angle may be varied between a feathered position of, for example, 90° down to a fully powered position of, for example, 0°.

In the exemplary embodiment, a blade pitch of each rotor blade 22 is controlled individually by a control system 36. Alternatively, the blade pitch for all rotor blades 22 may be controlled simultaneously by control system 36. When the blade pitch angle, in the following also referred to as pitch angle, is lowered, i.e. when the rotor blade is rotated towards the fully-powered position, power intake of rotor 18 is increased.

Further, in the exemplary embodiment, as direction 28 changes, a yaw direction of nacelle 16, more specifically an azimuthal direction of nacelle 16, may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
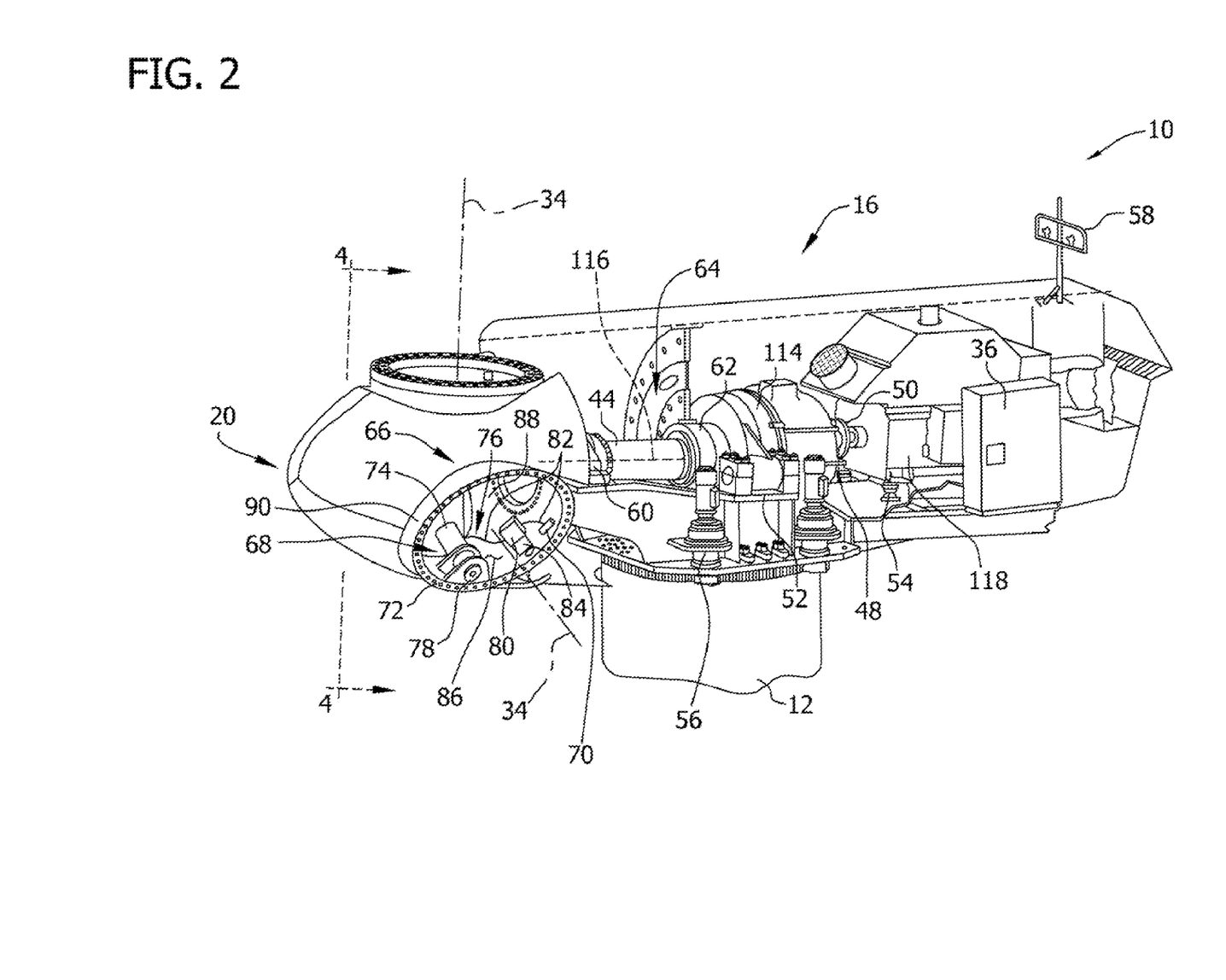
FIG. 2 is a schematic view of an exemplary electrical and control system suitable for use with the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 118 positioned within nacelle 16 by rotor shaft 44 (sometimes referred to as either a main shaft or a low speed shaft), a gearbox 11, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 118 with coupling 50 and rotation of high speed shaft 48 facilitates production of electrical power by generator 118. Gearbox 46 and generator 118 are supported by a support 52 and a support 54. In the exemplary embodiment, gearbox 46 utilizes a dual path geometry to drive high speed shaft 48. Alternatively, rotor shaft 44 is coupled directly to generator 118 with coupling 50.

Nacelle 16 also includes a yaw drive mechanism 56 of a yaw system that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 118. Alternatively, nacelle 16 includes any number of support bearings that enable wind turbine 10 to function as disclosed herein. Rotor shaft 44, generator 118, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Sensor 70 may be configured to measure a corresponding pitch angle of associated rotor blade 22. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 typically also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. Typically, wind turbine 10 feeds active and/or reactive power into a grid during normal operation, for example in a wind farm. In one embodiment, when rotor 18 operates at rotor overspeed, overspeed control system 80 overrides control system 36, such that control system 36 no longer controls pitch drive system 68 and overspeed control system 80 controls pitch drive system 68 to rotate rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
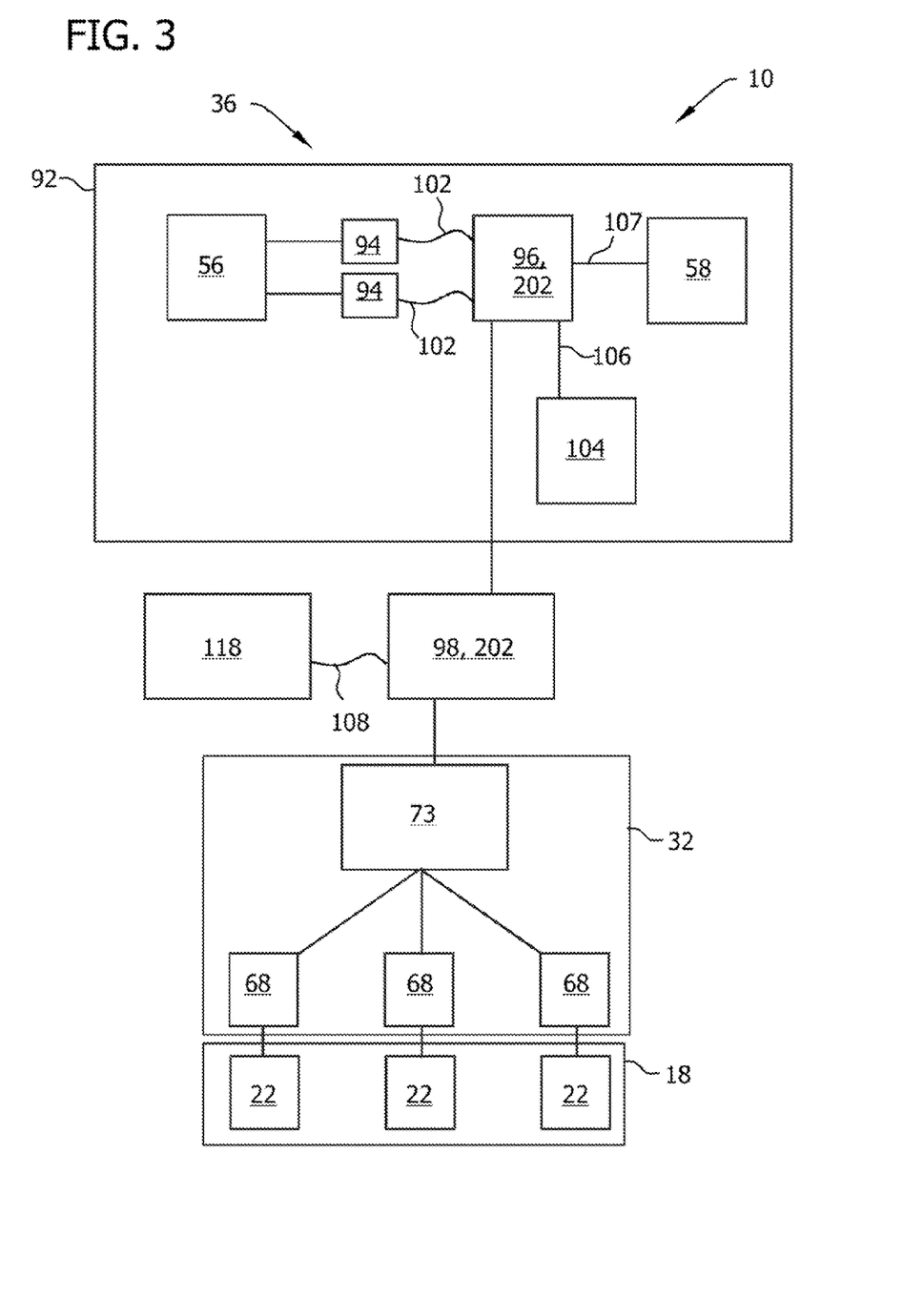
FIG. 3 is a schematic view of a wind turbine according to an embodiment.

FIG. 3 is a schematic view of a wind turbine 10 having a control system 36. Control system 36 is configured to monitor and control at least some of the operational variables associated with wind turbine 10. In the exemplary embodiment, control system 36 includes a pitch control system 98, a yaw system 92 and a pitch system 32. Pitch control system 98 is connected with generator 118 through one or more cables 108. Typically, pitch control system 98 is configured to receive any number of voltage and/or electric current measurement signals and/or power measurements from any number of respective sensors (not shown in FIG. 3) to monitor the output of the generator. Furthermore, pitch control system 98 is typically configured to issue power set-points, for example set-points for active power and/or reactive power, and/or torque set-points to generator 118 to control power output of generator 118.

In the exemplary embodiment, pitch control system 98 is connected with a yaw system 92 and a pitch system 32. The pitch control system 98 may, for example, be formed by a turbine controller 202. Control system 36 and turbine controller 202, respectively, is a typically also connected with and may monitor and/or control further subsystems, for example a gearbox and a cooling system of the wind turbine (both not shown in FIG. 3).

As schematically shown in FIG. 3, yaw system 92 includes at least one yaw motor 94 configured to adjust a yaw angle of wind turbine 10. In particular, yaw motor 94 may form part of, or be coupled to, yaw drive mechanism 56 for effecting rotation of nacelle 16 about yaw axis 38. Yaw system 92 may include more than one yaw motor. For example, the exemplary embodiment depicted in FIG. 3 includes two yaw motors 94. Yaw system 92 may include any suitable number of yaw motors 94 that enable yaw system 92 to conveniently control yaw of wind turbine 10. For example, yaw system 92 may include between two and six yaw motors 94.

The at least one yaw motor 94 can generate a torque M for rotating nacelle 16, torque M being smaller than or equal to a maximum torque Mmax. Torque M of the at least one yaw motor may be positive or negative (i.e., torque M may be effected in counter clockwise or clockwise direction) depending on the direction of rotation required in order to align, or maintain aligned, rotor 18 to the desired yaw direction. For example, but not limited to, during operation of wind turbine 10, torque M may include torque values between 3000 and −3000 kNm or, more specifically, between 1500 and −1500 kNm, even more specifically between 1000 and −1000 kNm.

Typically, yaw system 92 includes a yaw control system 96 for operating yaw motors 94. Yaw control system 96 may be operatively coupled to the at least one yaw motor 94 through cables 102. Yaw control system 96 may be provided separated from turbine controller 202. Alternatively, yaw control system 96 may be provided by turbine controller 202.

Typically, yaw control system 96 is configured to continuously operate the at least one yaw motor 94 during a period of time for maintaining the wind turbine at a yaw set point. In other words, yaw system 92 may be configured for: a) reorienting nacelle 16 and rotor 18 towards a specific direction; and b) actively maintaining nacelle 16 and rotor 18 pointing to the specific directions. The latter function could be compared to an active braking of yaw rotation of wind turbine 10.

According to at least some embodiments herein, wind turbine 10 may further include a yaw brake system (not shown) for use in combination with to yaw system 92. For example, such yaw brake system may be a hydraulic or electric brake configured to fix the position of nacelle 16 when required in order to avoid wear and high fatigue loads on wind turbine components. Yaw brake system may be configured to operate in case of failure of yaw system 92. The yaw brake system may be configured to operate in combination with yaw system 92 for maintaining nacelle 16 and rotor 18 pointing to a specific direction.

As depicted in FIG. 3, yaw control system 96 is typically configured to receive a yaw reference signal based on a signal from one or more yaw sensor(s) 104 configured to sense at least one of position of at least one reference point that is affected by the operation of the yaw system 92. In particular, yaw control system 96 may directly receive a signal from yaw sensor(s) 104 or may receive that signal after being processed by other elements of wind turbine 10. The reference point may be placed on the circumference of forward support bearing 60 and/or aft support bearing 62, adjacent to a yaw motor 94, or on another suitable location such as inside nacelle 16. Yaw sensor(s) 104 are typically communicatively coupled to yaw control system 96 through one or more cables 106, or other elements processing the signal generated by yaw sensor (s) 104, in order to provide yaw control system 96 with a yaw reference signal. Typically, the yaw reference signal corresponds to an actual value of the yaw angle.

Alternatively, or in addition thereto, yaw control system 96 is further configured to receive a wind reference signal from sensor(s) provided in a meteorological mast 58. The wind reference signal typically includes strength and direction W of oncoming wind. More specifically, meteorological mast 58 (shown in FIG. 2) may include a wind vane and anemometer (neither shown in FIG. 2) for generating data included in the wind reference signal. A sensor in meteorological mast 58 is typically communicatively coupled to yaw control system 96 through one or more cables 107, or other elements processing the signal generated by the sensor, in order to provide yaw control system 96 with a yaw reference signal.

Typically, yaw control system 96 also receives input data from the at least one yaw motor 94 regarding the current motor torque M and/or other operating conditions of the at least one yaw motor 94, and gives instructions to the at least one yaw motor 94 as output data.

Yaw system 92 may be configured to achieve optimal operation of wind turbine 10. This optimal operation may be achieved when nacelle 16 with rotor 18 are rotated towards a specific direction, herein referred to as the yaw set point. This specific direction may be determined using the wind direction or other factors that are deemed to be relevant. For example, a yaw set-point may strive to achieve an orientation of the plane of rotor 18, i.e. the plane comprising rotor blades 22, which is substantially perpendicular to wind direction 28. Accordingly, a maximum power may be converted from wind power. Furthermore, mechanical loads may be reduced in this way. Typically, the yaw set-point corresponds to a specific alignment of rotor 18 relative to wind direction 28. The yaw set-point may however also correspond to other properties of the yaw system, such as for instance the yaw speed, the yaw acceleration or the yaw torque. As used herein, the wording of a rotor that is substantially perpendicular to the wind direction intends to describe that an azimuthal component of the wind direction is substantially identical, i.e. with a resolution of less than about 2°, more typically with a resolution of less than about 1°, with the azimuthal component of the normal vector of a plane comprising the rotor blades 22.

Typically, yaw system 92 is configured to use the reference signals set forth above for generating one or more control signals for operating the at least one yaw motor 94, so that yaw system 92 facilitates an optimal operation of wind turbine 10. For example, at least during partial load operation of wind turbine 10 yaw system 29 positions the rotor of wind turbine 10 such, that a maximum power may be converted from the wind. Typically, the yaw control signal corresponds to a set-point of the yaw angle to a yaw motor set point or other control signal generated by yaw control system 96 for operation the at least one yaw motor 94. Further, yaw system 92 may generate output data based on one or more control parameters for effecting operation of the at least one yaw motor 94. The output data may include an instruction regarding magnitude of the desired motor torque M and/or the desired direction and speed of movement of nacelle 16 relative to tower 12 in accordance with the set point.

According to at least some embodiments herein, after yaw system 92 establishes a yaw set-point, the actual yaw angle of rotor 18 is compared with the yaw set-point and the difference is determined by yaw system 92 as a yaw error. In the following the yaw error is also referred to as yaw misalignment. Such a yaw misalignment may be caused by strongly fluctuating wind conditions, for example by a gust. Typically, the yaw misalignment is determined as an azimuthal yaw misalignment, for example as a difference between the azimuth of the normal vector of the rotor plane and the azimuth of wind direction.

When a yaw misalignment is detected, yaw system 92 typically applies a torque M through the at least one yaw motor 94 in order to turn nacelle 16 and rotor 18 towards the yaw set-point and to minimize this yaw error. The yaw set-point can be monitored and re-calculated at any given time, in order to keep the set-point up to date as the wind direction or wind strength changes. Thereby, yaw system 92 may continuously strive to minimize the yaw error and reach the yaw set-point. The more powerful the yaw motors 94 are, the faster a yaw misalignment may be reduced. Furthermore, more powerful yaw motors 94 may withstand higher gusts. However, more powerful yaw motors 94 also consume more electric power and are more expensive.

According to an embodiment, yaw system 92 is operable as a active yaw system. In this embodiment, the maximum motor torque of yaw motors 94 used during operation is not high enough to keep the nacelle and rotor 18 always in the desired position, for example in a position in which rotor 18 is substantially perpendicular to the wind direction. Accordingly, the nacelle may, for example at higher gusts, move softly with the wind until it becomes possible for the yaw motors 94 to rotate the nacelle and rotor 18 towards the desired position again. Accordingly, less power is typically used to operate yaw motors 94. Furthermore, smaller and thus less expensive yaw motors 94 may be used.

Typically, pitch control system 98 is connected with a pitch controller 73 for controlling pitch drive systems 68. Each pitch drive system 68 is coupled to a respective rotor blade 22 for modulating the blade pitch of associated rotor blade 22 about pitch axis 34 (shown in FIG. 1). Depending on a detected mismatch between power set-points of generator 118 and actual power values, pitch control system 98 may issue a set-point or a sequence of set-points for the pitch angle of the at least one rotor blade 22 to pitch controller 73. After receiving the set-point or set-points for the pitch angle, pitch controller 73 operates the at least one of pitch drive systems 68 so that the at least one rotor blade 22, for example all three rotor blades 22 illustrated in FIG. 3, is rotated towards and finally into a pitch angle as set by pitch control system 98.

According to an embodiment, the rotor blades 22 may have at least two segments that may be rotated relative to each other about pitch axis 34. In this embodiment, aerodynamic efficiency of the rotor blades 22 may be tuned by respective sets of pitch angles for each rotor blade 22, wherein the set of pitch angles includes a pitch angle for each segment of the rotor blades 22.

Please note that pitch controller 73 may be a centralized controller associated to a plurality of pitch drive 68, such as exemplarily shown in FIG. 3. Alternatively, wind turbine 10 may include a distributed pitch controller including, for example, a plurality of pitch controllers, each of the pitch controllers being associated to a respective pitch drive 68.

During normal operation and when the nacelle and rotor 18, respectively, are in the desired position, for example in a position in which rotor 18 is substantially perpendicular to the wind direction, pitch control system 98 may calculate pitch angle set-points and issue the pitch angle set-points to pitch controller 73 to maintain rotational speed of rotor 18, to close-loop control power output of the generator and/or to maximize power output of the generator.

According to an embodiment, control system 36 is configured to determine a difference between the actual yaw angle and the yaw angle set-point and to determine based on the difference if the pitch angle is only to be increased. For example, in an event of high winds, a high upflow, a high turbulence and/or a gust, rotor 18 yaw system 92 may no longer counteract the yaw moment induced by rotor 18. Accordingly, rotor 18 may be temporarily turned out of the wind which results in a yaw misalignment of rotor 18. In the exemplary embodiment, yaw control system 96 detects the yaw misalignment by comparing an actual value of the yaw angle measured by yaw sensor(s) 104 with a set-point of the yaw angle. When the absolute value of the difference between the actual yaw angle and the yaw angle set-point is larger than a predefined first threshold, yaw control system 96 issues a signal to pitch control system 98 which prevents the pitch control system 98 to increase the pitch angle set-point. Accordingly, the power output of the generator may be reduced. This in turn prevents a possible overspeed of rotor 18 which may result in an emergency shut-down of the wind turbine. If the pitch angle would be increased during a yaw misalignment to compensate reduced power intake of rotor 18, a possible later change of wind direction which reduces the yaw misalignment would result in a large torque accelerating rotor 18. This is prevented by latching the pitch angle during the yaw misalignment.

The first predefined threshold may depend on the wind turbine and the control scheme of the wind turbine. Typically, first predefined threshold is larger than about 10°, more typically larger than about 25° and even more typically larger than about 45° for active yaw control.

In embodiments in which the aerodynamic efficiency of rotor 18 may by influenced by additional flaps of rotor blades 22 or by an active flow control, the increase of power intake of rotor 18 by changing orientation of flaps and changing the active flow control, respectively, is typically also disabled after detecting the yaw misalignment.

When the yaw misalignment later drops below a second predefined threshold, which is typically lower than the first predefined threshold, yaw control system 96 typically issues a further signal to pitch control system 98 to override the imposed restrictions on the changes of the pitch angle. Accordingly, increasing pitch angle set-points may again be scheduled to increase power output of the generator.

Figure 4:
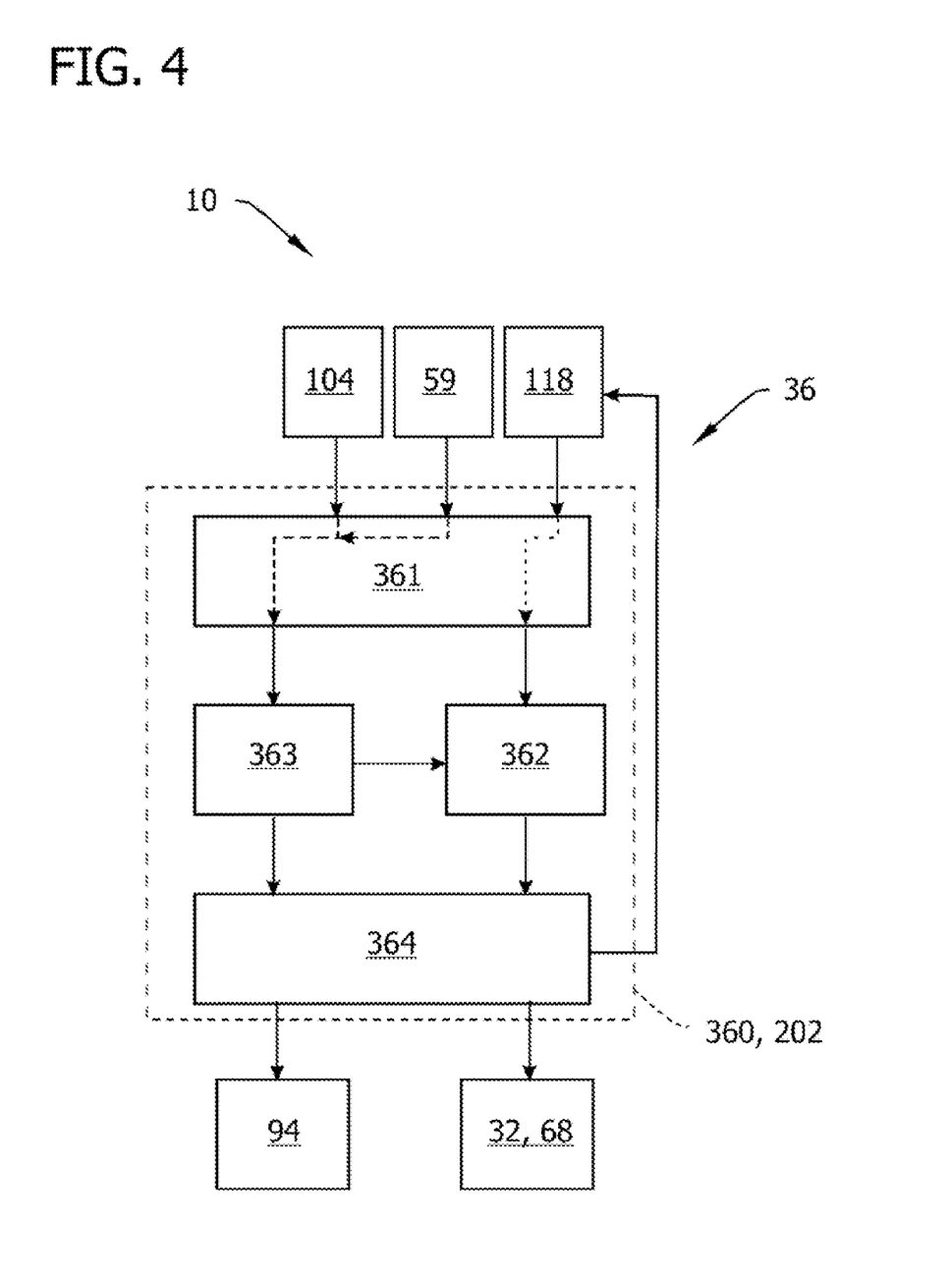
FIG. 4 is a schematic view of a wind turbine control system according to an embodiment.

FIG. 4 is a schematic view of control system 36 of wind turbine 10. In the exemplary embodiment, a main controller 360, for example turbine controller 202 controls generator 118, pitch system 32 and yaw motor(s) 94.

According to an embodiment, main controller 320 includes an input module 361, a pitch module 362 and a yaw module 363. The modules of main controller 360 may be realized in hardware and/or in software, for example as program modules or program threads running on a suitable computer or controller hardware. Input module 361 is connected with a yaw sensor 104 configured to measure and transmit to input module 361 an actual value of the yaw angle of the wind turbines yaw system. Further, input module 361 is connected with wind vane 59 and/or anemometer 59 configured to measure and to transmit to input module 361 at least a wind direction. As indicated by the dashed arrows in box 361 representing the input module, input module 361 is configured to transfer the actual value of the yaw angle and the measured wind direction to yaw module 363.

In the exemplary embodiment, input module 361 is connected with generator 118 and configured to receive an actual value of a status of the generator of the wind turbine, for example an output value such as electrical power and/or rotor speed. Typically, input module 361 is connected with generator 118 via respective sensors. As indicated by the dotted arrow in the respective box, input module 361 is configured to transfer the actual value of the generator status to pitch module 362.

Alternatively or in addition, input module 361 is connected with a converter or an inverter connected to generator 118 and configured to convert electrical power produced by generator 118. In these embodiments, the input module 361 is typically configured to receive an actual value of the status of the converter and the inverter, respectively. In other words, input module 361 is connected with an electrical system including at least generator 118. Optionally, the electrical system includes one or more switches, an inverter or a converter and/or one or more sensors to measure an actual value of a status of the electrical system. The electrical system is configured to receive an actual value of the status of the electrical system, for example of generator 118.

Typically, main controller 360 includes an output module 364 which is connected with the yaw module 363 and the pitch module 362. In the exemplary embodiment, output module 364 is further connected with yaw motor(s) 94 and pitch system 32 to output yaw set-points to yaw motor(s) 94 and pitch angle set-point to pitch system 32, respectively. Furthermore, output module 364 is further connected with the electrical system, with generator 118 in the exemplary embodiment of FIG. 4, and configured to send a set-point of the status to the electrical system, for example to generator 118, the converter and the inverter, respectively.

As explained above with regard to FIG. 3, pitch module 362 and yaw module 363 may also be provided by two separated controllers. In these embodiments, each of the two separated controllers has its own input module and output module.

Pitch module 362 is typically configured to determine a pitch angle set-point for pitch system 32 so that the status of generator 118 and a set-point of the status of generator 118 substantially match.

According to an embodiment, yaw module 363 is connected with the pitch module 362. Yaw module 363 is configured to determine a yaw angle set-point and a difference between the yaw angle set-point and the actual value of the yaw angle. Depending on this difference, yaw module 363 determines if changes of the pitch angle and the rotor blade, respectively, in direction to a fully-powered position are to be limited, for example if the pitch angle is only to be increased. If the difference between the yaw angle set-point and the actual value of the yaw angle is larger than a predefined first threshold, i.e. when a yaw misalignment of the wind turbine rotor above this threshold is detected, yaw module 363 typically prevents pitch module 362 to increase the pitch angle set-point, for example by sending a first signal or command to pitch module 362. Only if at a later time the difference between the yaw angle set-point and the actual value of the yaw angle drops below a second predefined threshold, yaw module 363 allows pitch module 362 to issue again increasing pitch angle set-points. For this purpose, yaw module 363 may send a corresponding second signal or command to pitch module 362. In so doing, an overspeed of the wind turbine rotor that may occur during yaw misalignment without disabling lowering the pitch angle may be prevented by main controller 360 and control system 36, respectively. Accordingly, an emergency shut-down of wind turbine 10 caused by rotor overspeed may be avoided and thus the system availability of wind turbine 10 increased.

According to an embodiment, the yaw module 363 prevents the decrease of the pitch angle when a function, for example a time integral, of the difference between the yaw angle set-point and the actual value of the yaw angle is larger than a further predefined threshold.

According to an embodiment, pitch module 362 changes the pitch scheme after receiving the first signal from yaw module 363 indicating that a yaw misalignment was detected. The pitch module 362 may use a latched function to prevent that the pitch angle is decreased towards a fully powered position.

Alternatively, pitch module 362 may continuously ramp the pitch angle. For example, pitch module 362 may cause the rotor blades to continuously move towards feathered position. This may be done until pitch module 362 receives the second signal from yaw module 363. Accordingly, speed of pitch angle is limited to positive values during yaw misalignment. This prevents overspeed of the wind turbine rotor as wind varies.

According to an embodiment, pitch module 362 cause the rotor blades to continuously move towards feathered position when the yaw misalignment lasts longer than a time threshold of, for example, about 30 seconds to about 1 minute of about several minutes. The value of the time threshold typically depends on the yaw misalignment and tends to be smaller for higher values of the yaw misalignment. Accordingly, a longer lasting yaw misalignment may be avoided. Furthermore, the power intake of the rotor is typically reduced by continuously increasing the pitch angle. This typically also results in realigning of the rotor.

Figure 5:
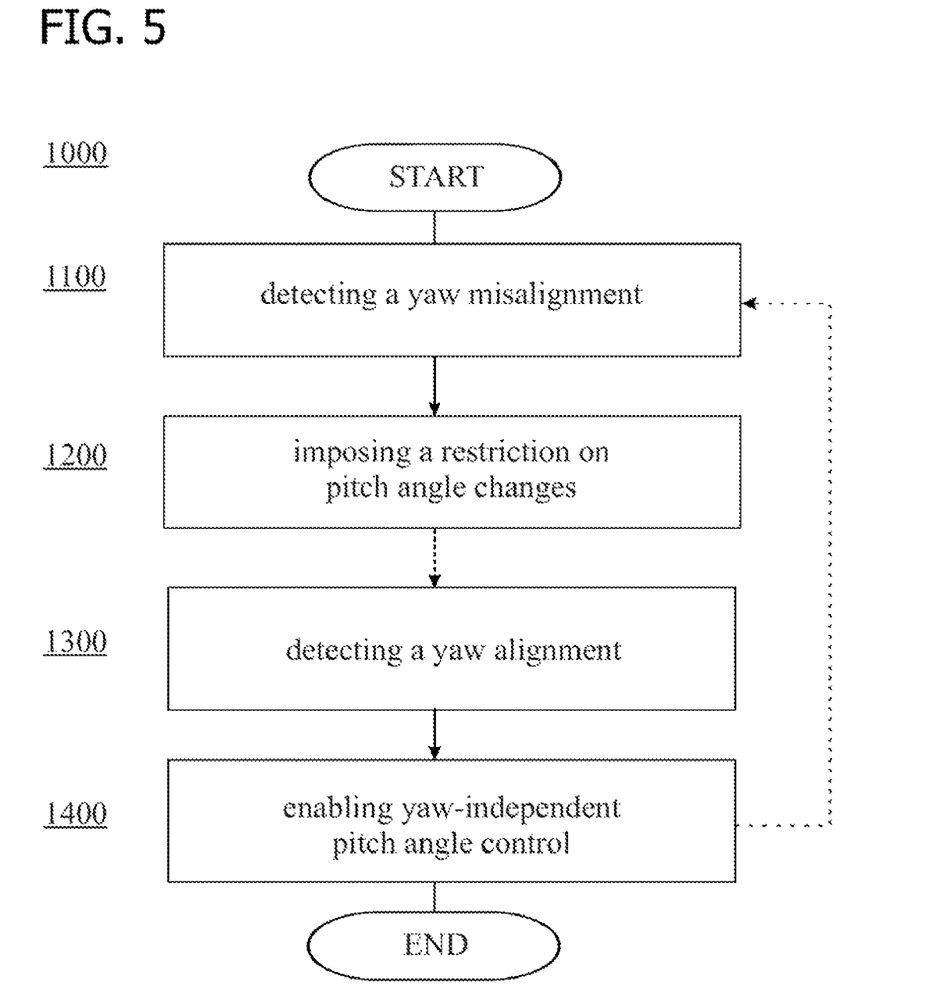
FIG. 5 is a flow diagram for preventing a possible overspeed of a wind turbine rotor according to an embodiment.

FIG. 5 is a flow diagram of a method 1000 for preventing a possible overspeed of a wind turbine rotor to which at least one rotor blade is mounted. In a first block 1100, a yaw misalignment of the rotor is detected. The yaw misalignment may be due to a gust and/or a changing wind direction and/or increasing wind speed and/or change of yaw position due to slipping of the yaw system.

In a subsequent block 1200, a restriction is imposed on changes of a pitch angle of the at least one rotor blade. The restriction is only imposed on changes of the pitch angle in direction towards a fully-powered position of the rotor blade. For example, a decrease of the pitch angle may be limited and/or cut. In doing so, at least the increase of the rotors power intake out of the wind is limited. This may temporarily limit the electric power production of the wind turbine. On the positive side, a possible overspeed of the rotor may be avoided. Rotor overspeed may result when the wind turbine is operated without the restriction and the wind direction changes again so that the power intake is increased. Due to avoiding rotor overspeed, an emergency shut-down of the wind turbine may be avoided. As a result the overall power production of the wind turbine may even be increased. Furthermore, the wind turbine becomes more robust to changes of wind direction.

Method 1000 may be implemented during active yaw control of the wind turbine. During active yaw control, the rotor is allowed to move softly with the wind at higher wind speeds. For example, the yaw mismatch may last up to several minutes. Therefore, the availability of active yaw controlled wind turbines may significantly be increased by applying method 1000.

Typically, the pitch angle may only be changed in direction towards feathered position, i.e. increased, after detecting the yaw misalignment. Accordingly, an increase of the power intake of the rotor is avoided. This results in a simple and particularly save control method for preventing the possible overspeed of the rotor.

In embodiments of wind turbines having rotor blades which have at least two blade sections that may be rotated independently about the respective pitch axis, limiting changes of the pitch angle to changes in direction towards the feathered position may include preventing a further decrease of a first pitch angle of a primary pitch system of the rotor blade and preventing a further decrease of a second pitch angle of a secondary pitch system of the rotor blade.

Furthermore, the increase of power intake of the rotor by changing an active flow control and/or by changing an angle of an additional rotor blade flap is typically also disabled after detecting the yaw misalignment. Accordingly, a respective increase of the power intake of the rotor is avoided.

Detecting the yaw misalignment typically includes determining an actual value of a yaw angle, and comparing the actual value of the yaw angle with a set-point of the yaw angle. Typically, the actual value of the yaw angle is measured. At a gust and/or at a high wind speed, the measured actual value of the yaw angle may differ from a previously issued set-point of the yaw angle due to a slipping of the yaw system. In the following this difference is also referred to as slipping error of the yaw system.

When a changing wind direction is detected, the yaw system may determine a new set-point of the yaw angle. The new set-point of the yaw angle may also be compared with the actual value of the yaw angle to determine a measure for the yaw misalignment.

According to an embodiment, the restriction on the changes of the pitch angle is imposed when a difference between the actual value of the yaw angle and a set-point of the yaw angle is larger than a preselectable first threshold which typically ranges between about 5° to about 25°, more typically between about 10° to about 20°.

Detecting the yaw misalignment may also include detecting an increasing yaw mismatch. When the yaw mismatch increases with a speed which is higher than a preselectable speed threshold of, for example, 5° per second or 8° per second, the restriction on changes of the pitch angle may be imposed. The thresholds for the yaw angle mismatch and the yaw angle speed may be used alternatively and/or in parallel as criterion for imposing the restriction on the changes of the pitch angle.

Typically, the yaw angle mismatch and/or the yaw angle speed are closed-loop controlled. At least as long as the respective threshold is (are) exceeded, the restriction on the changes of the pitch angle remains imposed to safely avoid possible rotor overspeed.

If a reduced yaw misalignment of the rotor is detected later in a block 1300, yaw-independent pitch angle control is typically again enabled in a subsequent block 1400. Accordingly, pitch angle may again be decreased and thus the electric power production of the wind turbine increased.

Typically, method 1000 is implemented as a close-loop control as indicated by the dashed arrow in FIG. 5.

Figure 6:
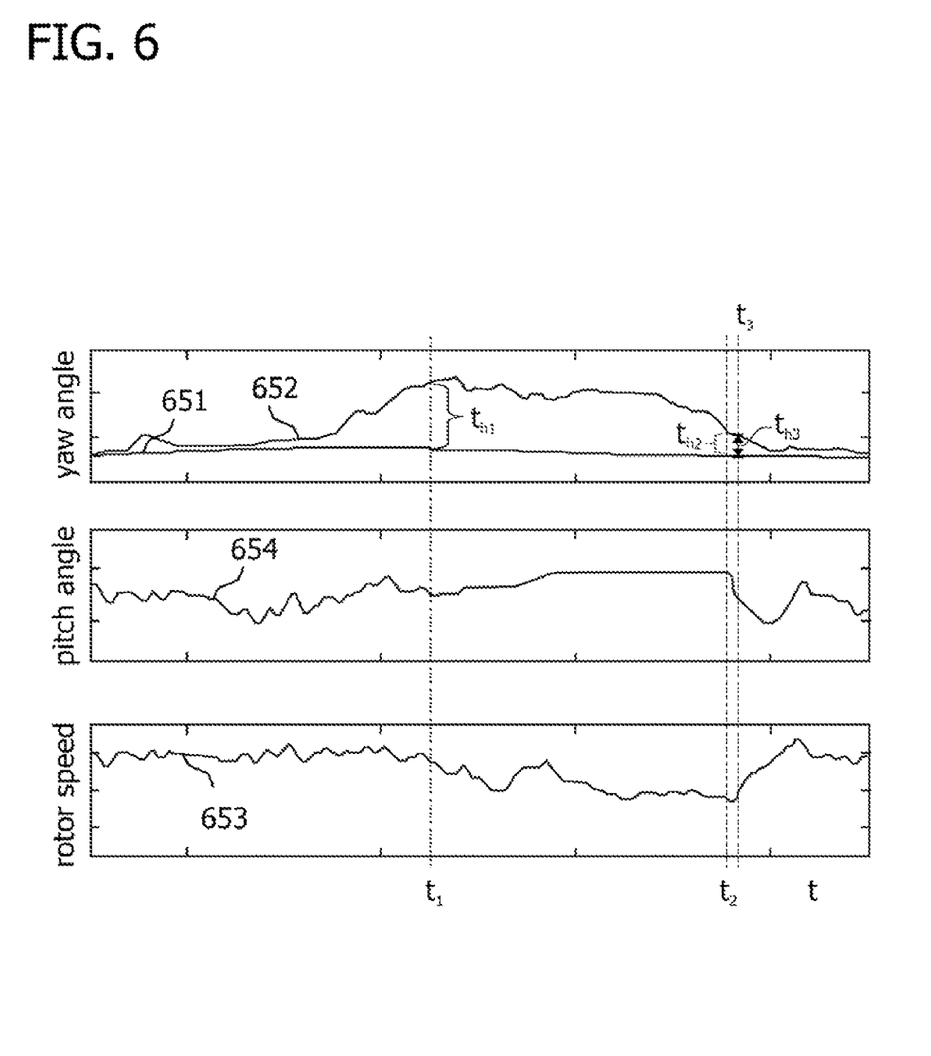
FIG. 6 shows exemplary curves for a yaw angle, a pitch angle and a rotor speed of a wind turbine operated according to the flow diagram of FIG. 5.

FIG. 6 shows exemplary curves for the yaw angle, the pitch angle and the rotor speed of an active yaw controlled wind turbine operated in accordance with the flow diagram of FIG. 5. The yaw angle, the pitch angle and the rotor speed are given in arbitrary units as function of time t. The exemplary illustrated time interval of normal wind turbine operation may correspond to about four minutes. In the exemplary embodiment, the wind turbine is a variable speed wind turbine. Accordingly, the wind turbine may convert electrical power from wind energy with varying rotor speed 653. The yaw angle is plotted both as yaw angle set-point 651 and as actual yaw angle 652. As can be inferred from the curves 651, 652, yaw angle set-point 651 and actual yaw angle 652 may deviate from each other due to changing wind conditions. As the wind turbine is operated in an active yaw mode, a small mismatch between yaw angle set-point 651 and actual yaw angle 652 is tolerated without changing the control scheme. Accordingly, the pitch angle 654 is initially controlled independent of the yaw mismatch. At a time $t_1$ the mismatch between yaw angle set-point 651 and actual yaw angle 652 becomes larger than a given first threshold $th_1$ of, for example, 15°. To avoid a possible overspeed of the rotor, pitch angle 654 is latched at time $t_1$ to changes towards the feathered position, i.e. pitch angle 654 is not allowed to decrease. At a later time $t_2$, the yaw mismatch drops below a given second threshold $th_2$. Now, lowering of pitch angle 654 is again allowed. However, the speed of pitch angle towards the fully-powered position is typically limited until the yaw mismatch further drops below a given third threshold $th_3$ at a time $t_3$. At time $t_3$ the yaw peed limitation is removed so that pitch angle 654 is again controlled independent of the yaw mismatch.

The above-described systems and methods facilitate avoiding a possible overspeed of the rotor during a misalignment of the rotor relative to direction of wind. Thus, emergency shut-downs of the wind turbine may be avoided.

Exemplary embodiments of wind turbines and wind farms and related methods are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for preventing a possible overspeed of a rotor of a wind turbine, comprising:
   detecting a yaw misalignment of the rotor; and,
   imposing a restriction on changes of a pitch angle towards a fully-powered position of at least one rotor blade mounted to the rotor after detecting the yaw misalignment.

2. The method of claim 1, wherein imposing the restriction comprises limiting changes of the pitch angle to changes in a direction towards a feathered position of the at least one rotor blade.

3. The method of claim 2, wherein limiting changes of the pitch angle comprises at least one of preventing a further decrease of a first pitch angle of a primary pitch system of the at least one rotor blade, preventing a further decrease of a second pitch angle of a secondary pitch system of the at least one rotor blade, and limiting a speed of the pitch angle.

4. The method of claim 1, wherein the restriction remains imposed during the yaw misalignment.

5. The method of claim 1, further comprising preventing an increase of a power intake of the rotor by changing an active flow control and/or by changing an angle of a rotor blade flap.

6. The method of claim 1, wherein detecting the yaw misalignment comprises at least one of:
- determining an actual value of a yaw angle; and,
- comparing the actual value of the yaw angle with a set-point of the yaw angle.

7. The method of claim 6, wherein the restriction on the changes of the pitch angle is imposed when a difference between the actual value of the yaw angle and the set-point of the yaw angle is larger than a first threshold, and/or when an increase of a difference between an actual value of the yaw angle and a set-point of the yaw angle per time is larger than a speed threshold.

8. The method of claim 1, further comprising, when the yaw misalignment lasts longer than a time threshold, at least one of continuously changing the pitch angle in a direction towards a feathered position of the at least one rotor blade, and realigning the rotor.

9. The method of claim 1, further comprising:
- detecting a difference between an actual value of a yaw angle and a set-point of the yaw angle which drops below a second threshold; and,
- limiting a speed of the pitch angle.

10. The method of claim 1, further comprising:
- detecting a difference between an actual value of a yaw angle and a set-point of the yaw angle which drops below a third threshold; and,
- allowing yaw-independent control of the pitch angle.

11. The method of claim 1, wherein the restriction is imposed during active yaw control of the wind turbine.

12. A wind turbine, comprising:
- rotor;
- at least one rotor blade mounted to the rotor; and,
- a control system comprising a pitch system configured to rotate the at least one rotor blade about a pitch axis and a yaw system configured to position the rotor with respect to a wind direction in accordance with a yaw angle set-point and comprising a yaw sensor configured to detect an actual yaw angle, the control system being configured to determine a difference between the actual yaw angle and the yaw angle set-point, and to determine based on the difference if a rotation of the at least one rotor blade in a direction to a fully-powered position is to be limited.

13. The wind turbine of claim 12, wherein the control system is configured to operate the yaw system as an active yaw system.

14. The wind turbine of claim 12, wherein the control system comprises a pitch control system connected to the pitch system and a generator mechanically coupled to the rotor, the pitch control system being configured to determine a pitch angle set-point for the pitch system in accordance with a set-point of the generator, wherein the yaw system comprises a yaw control system connected to the yaw sensor, wherein the yaw control system is configured to prevent decreasing the pitch angle set-point when the difference between the actual yaw angle and the yaw angle set-point is larger than a pre-defined first threshold.

15. The wind turbine of claim 14, wherein the wind turbine comprises a turbine controller and wherein at least one of the pitch control system and the yaw control system is provided by the turbine controller.

16. A control system for controlling a wind turbine, comprising:
- an input module configured to receive an actual value of a yaw angle of a yaw system of the wind turbine and an actual value of a status of an electrical system of the wind turbine;
- a pitch module connected with the input module and being configured to determine a pitch angle set-point so that the status of the electrical system and a set-point of the status of the electrical system substantially matches; and,
- a yaw module connected with the input module and the pitch module, the yaw module being configured to determine a yaw angle set-point and a difference between the yaw angle set-point and the actual value of the yaw angle, the yaw module being configured to prevent, depending on the difference between the yaw angle set-point and the actual value of the yaw angle, a decrease of the pitch angle set-point.

17. The control system of claim 16, further comprising an output module connected with the yaw module and the pitch module and configured to issue the pitch angle set-point to a pitch system of the wind turbine.

18. The control system of claim 16, wherein the yaw module is configured to prevent the decrease of the pitch angle when the difference between the yaw angle set-point and the actual value of the yaw angle is larger than a given first threshold.

19. The control system of claim 16, wherein the yaw module is configured to prevent the decrease of the pitch angle when a function of a difference between the yaw angle set-point and the actual value of the yaw angle is larger than a given second threshold, and/or when a difference between the yaw angle set-point and the actual value of the yaw angle is increasing faster than a given speed threshold.

20. The control system of claim 16, wherein the electrical system comprises at least one of a generator, a converter connected to the generator, and an inverter connected to the generator.

* * * * *